(12) United States Patent
Yang et al.

(10) Patent No.: US 9,237,513 B2
(45) Date of Patent: Jan. 12, 2016

(54) METHOD FOR PERFORMING A CELL SEARCH IN MULTIPLE ANTENNA WIRELESS SYSTEMS

(71) Applicant: Hong Kong Applied Science and Technology Research Institute Co., Ltd., Shatin, New Territories (CN)

(72) Inventors: Yin Yang, Shenzhen Guangdong (CN); Jiewei Ding, Shenzhen Guangdong (CN); Yuxian Zhang, Hong Kong (CN); Honglei Zhang, Hong Kong (CN); Kong Chau Tsang, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 14/304,781

(22) Filed: Jun. 13, 2014

(65) Prior Publication Data

US 2015/0365882 A1 Dec. 17, 2015

(51) Int. Cl.

| | |
|---|---|
| *H04L 1/00* | (2006.01) |
| *H04W 48/16* | (2009.01) |
| *H04W 24/10* | (2009.01) |
| *G06F 17/14* | (2006.01) |
| *H04W 24/02* | (2009.01) |
| *H04B 7/06* | (2006.01) |
| *H04J 11/00* | (2006.01) |

(52) U.S. Cl.
CPC .............. *H04W 48/16* (2013.01); *G06F 17/14* (2013.01); *H04B 7/0626* (2013.01); *H04J 11/005* (2013.01); *H04W 24/02* (2013.01); *H04W 24/10* (2013.01)

(58) Field of Classification Search
CPC ..... H04W 24/10; H04W 24/02; H04W 48/16; H04B 7/0626; H04J 11/005; G06F 17/14

USPC .......... 370/252, 254, 329; 455/434, 436, 437
See application file for complete search history.

(56) References Cited

U.S. PATENT DOCUMENTS

| | | | |
|---|---|---|---|
| 2007/0207824 A1* | 9/2007 | Bhattacharjee | ....... H04W 24/10 455/513 |
| 2009/0034501 A1 | 2/2009 | Hahm et al. | |
| 2013/0137427 A1 | 5/2013 | Krishnan | |
| 2013/0154880 A1* | 6/2013 | Dickman | ................ G01S 19/21 342/357.59 |
| 2013/0308481 A1* | 11/2013 | Kazmi et al. | ................... 370/252 |

FOREIGN PATENT DOCUMENTS

| | | |
|---|---|---|
| WO | WO-0055992 A1 | 9/2000 |
| WO | WO-0243256 A1 | 5/2002 |
| WO | WO-2013118127 A1 | 8/2013 |

* cited by examiner

*Primary Examiner* — Khai M Nguyen
(74) *Attorney, Agent, or Firm* — Norton Rose Fulbright US LLP

(57) ABSTRACT

A methods for performing a cell search in multiple antenna wireless systems using a plurality of spatial filters is disclosed, and includes applying a plurality of spatial filters to a plurality of received signal streams to generate a plurality of filtered signal streams. The plurality of received signal streams correspond to signals received at a plurality of receive antennas from a plurality of signal sources (e.g., neighboring cells). In an aspect, the plurality of spatial filters may be predefined spatial filters and may be weighted using a set of predefined filter weights. In an additional or alternative aspect, the plurality of spatial filters may be adaptive spatial filters and may be weighted using a set of dynamically determined filter weights. The method includes detecting physical network identities based on the plurality of filtered signal streams.

38 Claims, 9 Drawing Sheets

METHOD FOR PERFORMING A CELL SEARCH IN MULTIPLE ANTENNA WIRELESS SYSTEMS

TECHNICAL FIELD

The present disclosure generally relates to performing a cell search in a multiple antenna wireless system, and more particularly to performing a cell search in a multiple antenna wireless system using a plurality of spatial filters.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile devices. A mobile device may associate with (e.g., connect to) a base station, and communicate with the base station via downlink and uplink communication links, where downlink (or forward link) refers to a communication link used to transmit information from the base station to the mobile device, and the uplink (or reverse link) refers to a communication link used to transmit information from the mobile device to the base station.

Prior to associating with the base station or during a handover from the base station to another base station, the mobile device may perform a cell search to identify wireless communication networks that are within communication range of the mobile device. The wireless communication networks may be identified by physical network identities, which may be determined based on synchronization signals (e.g., a primary synchronization signal (PSS) and a secondary synchronization signal (SSS)) broadcast by one or more base stations proximate to or within communication range of the mobile device. The cell search may assist the mobile device in identifying a particular neighbor cell (e.g., a base station) to join.

Additionally, in some instances, a cell search may be performed by a base station. For example, a base station attempting to join a self-organizing network (SON) may perform a cell search to identify neighboring cells (e.g., neighboring base stations) that are within communication range of the base station. The neighboring cells may include cells with strong signal strength (e.g., strong cells) and cells with weak signal strengths (e.g., weak cells) relative to the strong cells. Signals (e.g., synchronization signals) transmitted by weak cells may suffer from high interference caused by the strong cells. This may reduce the likelihood that the weak cells are detected during the cell search, and may cause the base station to select a physical network identity that is already used by one of the weak cells. When this occurs, the base station may transmit synchronization signals that are identical to or otherwise interfere with the weak cell (e.g., because transmissions within the network are time synchronized), causing a physical network identity collision.

SUMMARY

Techniques for performing a cell search in a multiple antenna wireless system are disclosed herein. The cell search may be used to detect physical network identities associated with neighboring cells (e.g., base stations). In an aspect, the cell search may be performed by a mobile device to detect physical network identities of neighboring cells, such as to identify a best neighboring cell to join during a handover operation or upon starting up the mobile device (or a wireless communication capability of the mobile device). In an additional or alternative aspect, the cell search may be performed by a base station to detect physical network identities of neighboring cells, such as when the base station is attempting to establish a new cell in a self-organizing network (SON).

The cell search may be performed using a plurality of spatial filters configured to strengthen and suppress signals received various directions. The spatial filters may be weighted using a predetermined set of weights, or may be weighted using a dynamically determined set of weights. The dynamically determined set of weights may be determined based on a correlation of signals received at each of a plurality of receive antennas (e.g., receive antennas of the base station or the mobile device), and may enable dynamic rotation of the spatial filters based on signal strength of neighboring cells. The rotation of the spatial filters may configure the spatial filters to suppress signals in a direction of a neighboring cell having a high signal strength relative to signals received in other directions from other neighbor cells, and may facilitate detecting an increased number of neighbor cells and improved detection of weak neighbor cells.

During the cell search, physical network identities may be detected and/or selected based on a normalized correlation power of the received signals. The normalized correlation power may be determined from signal streams that have been processed by the spatial filters. Further, the normalized correlation power may be determined based on a correlation between one or more of the signal streams that have been processed by the spatial filters and local sequences specified by physical network identities. The results of the cell search (e.g., the detected and/or selected physical network identities) may be used to select a particular neighboring cell, such as during a handover, or upon starting up a mobile device or activating a wireless communication capability of the mobile device, or may be used to select a particular physical network identity to be used by a base station, such as when the base station is joining a SON.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other types of wireless networks and radio technologies.

Figure 1:
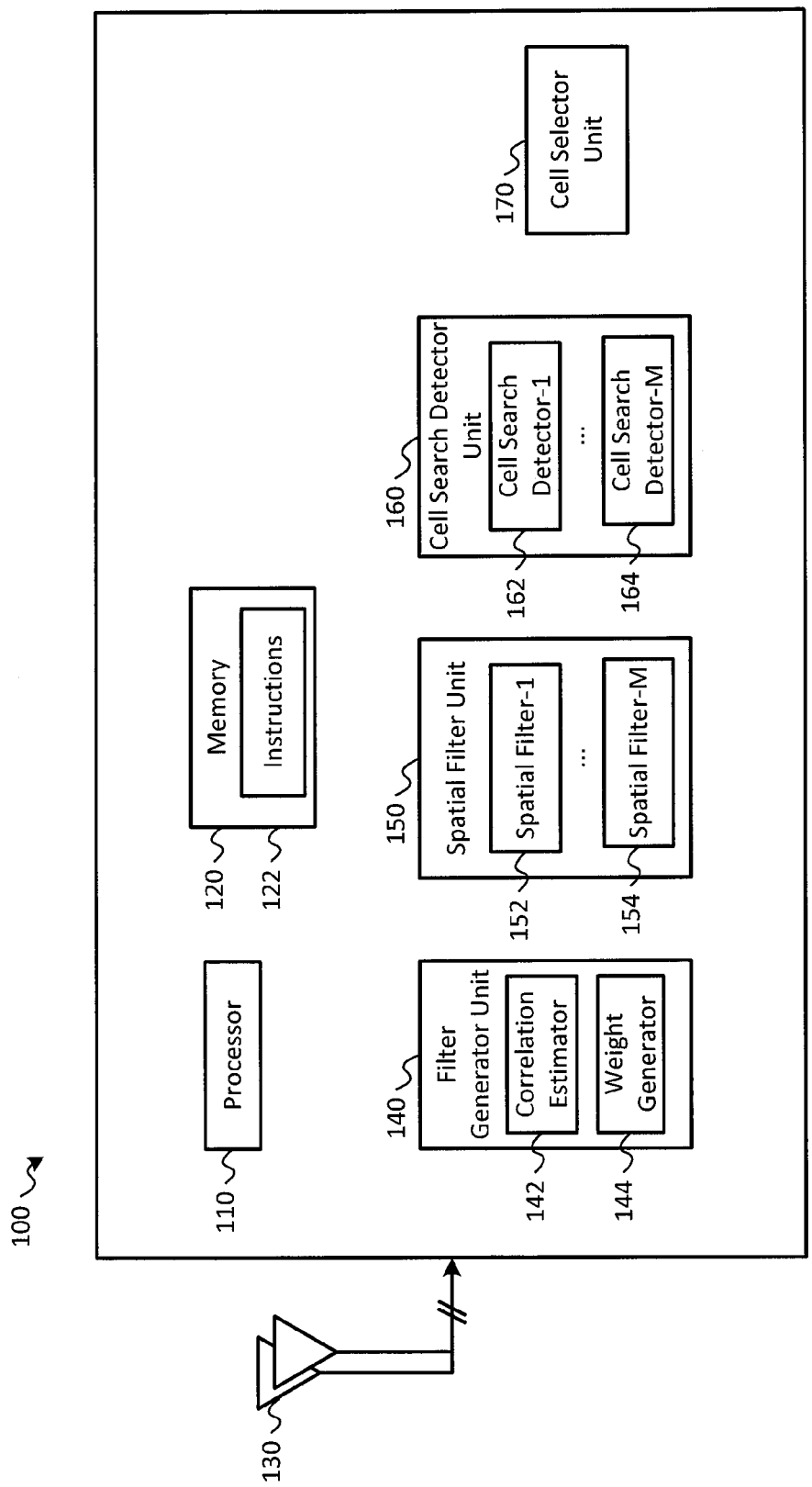
FIG. 1 is a block diagram illustrating exemplary aspects of an electronic device configured to perform a cell search in a multiple antenna wireless system using a plurality of spatial filters.

Referring to FIG. 1, a block diagram of an electronic device configured to perform a cell search in a multiple antenna wireless system using a plurality of spatial filters is shown as an electronic device 100. In an aspect, the electronic device 100 may be a base station operating in a wireless communication network. For example, the electronic device may be an evolved node B (eNode B), a macro cell, a femtocell, a pico cell, or another type of base station. Additionally or alternatively, the electronic device 100 may be a mobile device, such as a Smartphone, a personal digital assistant (PDA), a tablet computing device, a laptop computing device, or another type of wireless communication device. The electronic device 100 may be configured to communicate with one or more wireless networks according to one or more protocols (e.g., a $3^{rd}$ Generation (3G) protocol, a $4^{th}$ Generation (4G)/long term evolution (LTE) protocol, an 802.11 protocol, an 802.16 protocol, etc.). In an aspect, the electronic device 100 may be operating in a self-organizing network (SON).

As shown in FIG. 1, the electronic device 100 includes a processor 110, a memory 120, a plurality of antennas 130, a filter generator unit 140, a spatial filter unit 150, a cell search detector unit 160, and a cell selector unit 170. The processor 110 may be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein with reference to FIGS. 1-8. In an aspect, the filter generator unit 140, the spatial filter unit 150, the cell search detector unit 160, and the cell selector unit 170 may be integral to the processor 110. In an additional or alternative aspect, the filter generator unit 140, the spatial filter unit 150, the cell search detector unit 160, and the cell selector unit 170 may be distinct from the processor 110. For example, the filter generator unit 140, the plurality of spatial filter unit 150, the plurality of cell search detectors 160, and the cell selector 170 may be integrated within a receiver (not shown in FIG. 1) communicatively coupled to the plurality of antennas 130 and to the processor 110, or may be implemented as one or more separate processors (e.g., a digital signal processor (DSP), an application specific integrated circuit (ASIC), a field programmable gate array (FPGA) or other programmable logic device, discrete gate or transistor logic, discrete hardware components, or any combination thereof) distinct from the processor 110 that are to perform the functions described herein.

The memory 120 may store instructions 122. The memory 120 may include random access memory (RAM) devices, read only memory (ROM) devices, one or more hard disk drives (HDDs), flash memory devices, solid state drives (SSDs), erasable programmable read only memory (EPROM) devices, electrically erasable programmable read only memory (EEPROM) devices, magneto-resistive random access memory (MRAM) devices, optical memory devices, cache memory devices, other memory devices configured to store data in a persistent or non-persistent state, or a combination of different memory devices. Furthermore, the memory 120 may include computer-readable storage devices such as a compact disk (CD), a re-writable CD, a digital video disc (DVD), a re-rewritable DVD, etc. The instructions 122, when executed by the processor 110 (or the one or more separate processors), may cause the processor 110 (or the one or more separate processors) to perform the operations described herein with reference to FIGS. 1-8. In an aspect, the memory 120 may store a set of predefined weights (not shown in FIG. 1). As described in more detail below, the predefined weights may be used to perform cell detection and cell selection, such as by a mobile device attempting to join a network, or may be used to determine a synchronization signal to be broadcast, such as by a base station joining a SON.

The spatial filter unit 150 may include a plurality of spatial filters. For example, as shown in FIG. 1, the plurality of spatial filters may include M spatial filters, where M is ≥2. The M spatial filters may include a first spatial filter 152 (labeled "Spatial Filter-1" in FIG. 1) and an M-th spatial filter 154 (labeled "Spatial Filter-M" in FIG. 1). When M>2, the plurality of spatial filters may include additional spatial filters (not shown in FIG. 1 for simplicity of the figure). Thus, it is to be understood that the plurality of spatial filters included in the spatial filter unit 150 may include two spatial filters (e.g., the first spatial filter 152 and the M-th spatial filter 154) or may include more than two spatial filters.

The plurality of spatial filters may be weighted spatial filters. The filter generator unit 140 may be configured to generate the weighted spatial filters by applying weights to the plurality of spatial filters included in the spatial filter unit 150. In an aspect, the filter generator unit 140 may be configured to weight the plurality of spatial filters based on a pre-determined set of filter weights given by $\{\tilde{w}\ m,n\}$, for n=1 to N and m=1 to M, where N corresponds to the number of receive antennas included in the plurality of antennas 130, and where M corresponds to the number of spatial filters included in the spatial filter unit 150. The weights may be configured to uniformly distribute the spatial filters, such that the plurality of spatial filters cover a desired multi-dimensional space, as described further below and with reference to FIGS. 4 and 5.

For example, when N=2 and M=4, the predefined set of filter weights $\{\tilde{w}\ m,n\}$ may be:

$\{\tilde{w}\ 1,1, \tilde{w}\ 1,2\}=\{1,1\}$;
$\{\tilde{w}\ 2,1, \tilde{w}\ 2,2\}=\{1,-1\}$;
$\{\tilde{w}\ 3,1, \tilde{w}\ 3,2\}=\{1,j\}$; and
$\{\tilde{w}\ 4,1, \tilde{w}\ 4,2\}=\{1,-j\}$.

In this example, the spatial filter unit 150 may include M pre-defined spatial filters given by:

$$W_{pre4x2} = \begin{bmatrix} 1 & 1 \\ 1 & j \\ 1 & -1 \\ 1 & -j \end{bmatrix},$$

where $W_{pre4\times2}$ is an M by N matrix, where rows of $W_{pre4\times2}$ correspond to the weighted spatial filters, and where each of the spatial filters in $W_{pre4\times2}$ has 2 taps.

As another example, when N=2 and M=2, the spatial filters included in the spatial filter unit 150 may be given by:

$$W_{pre2x2} = \begin{bmatrix} 1 & 1 \\ 1 & -1 \end{bmatrix},$$

where $W_{pre2\times2}$ is an M by N matrix, where rows of $W_{pre2\times2}$ correspond to the weighted spatial filters, where each of the spatial filters in $W_{pre2\times2}$ has 2 taps, and where the predefined set of filter weights $\{\tilde{w}\ m,n\}$ is given by:

$\{\tilde{w}\ 1,1, \tilde{w}\ 1,2\}=\{1,1\}$; and
$\{\tilde{w}\ 2,1, \tilde{w}\ 2,2\}=\{1,-1\}$.

As yet another example, when N=4, and M=4, the pre-defined set of filter weights $\{\tilde{w}\ m,n\}$ may be given as:

$\{\tilde{w}\ 1,1, \tilde{w}\ 1,2, \tilde{w}\ 1,3, \tilde{w}\ 1,4\}=\{1,1,1,1\}$;
$\{\tilde{w}\ 2,1, \tilde{w}\ 2,2, \tilde{w}\ 2,3, \tilde{w}\ 2,4\}=\{1,1,-1,-1\}$;
$\{\tilde{w}\ 3,1, \tilde{w}\ 3,2, \tilde{w}\ 3,3, \tilde{w}\ 3,4\}=\{1,-1,1,-1\}$; and
$\{\tilde{w}\ 4,1, \tilde{w}\ 4,2, \tilde{w}\ 4,3, \tilde{w}\ 4,4\}=\{1,-1,-1,1\}$.

In this example, the spatial filter unit 150 may include M pre-defined spatial filters given by:

$$W_{pre4\times4} = \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

where $W_{pre4\times4}$ is an M by N matrix, where rows of $W_{pre4\times4}$ correspond to the weighted spatial filters, and where each of the spatial filters in $W_{pre4\times4}$ has 4 taps.

As shown in the exemplary sets of predefined spatial filters (e.g., $W_{pre2\times2}$, $W_{pre4\times2}$, and $W_{pre4\times4}$) provided above, each of the spatial filters may be weighted using ±1 and/or ±j. This may reduce the computational complexity of the spatial filter unit 150. However, it is noted that the exemplary techniques for weighting the spatial filters provided herein are provided for purposes of illustration, rather than by way of limitation, and other techniques for weighting the spatial filters may be used.

Signal streams $s_i(k)$ corresponding to signals received at each of the N antennas may be provided to the spatial filter unit 150. In an aspect, the signal streams $s_i(k)$ may be given by:

$$\begin{bmatrix} s_1(k) \\ \ldots \\ s_N(k) \end{bmatrix} = \sum_{l=1}^{L} \begin{bmatrix} h_{l,1} \\ \ldots \\ h_{l,N} \end{bmatrix} S_l(k) + \begin{bmatrix} n_1(k) \\ \ldots \\ n_N(k) \end{bmatrix},$$

where L is total number of neighboring cells surrounding the electronic device 100, where different values of l represent different physical network identities, and where $s_l(k)$ can be $p_l^{local}(k)$ if timing is aligned to synchronization signals transmitted from a neighboring cell associated with the l-th physical network identity, and where k is an delay offset used for time synchronization.

Figure 2:
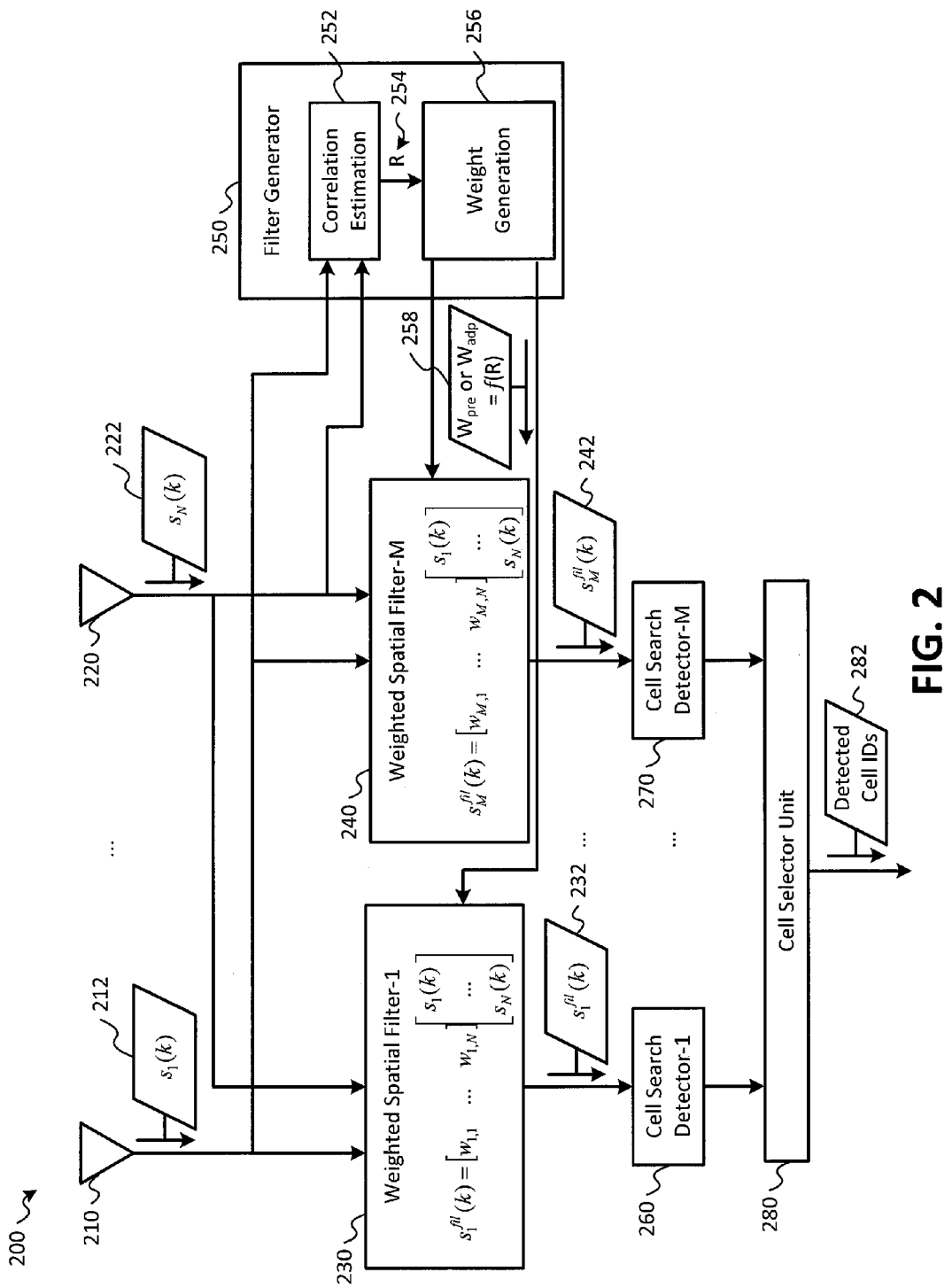
FIG. 2 is a block diagram illustrating exemplary aspects of generating weighted spatial filters for performing a cell search using multiple spatial filters.
Figure 3:
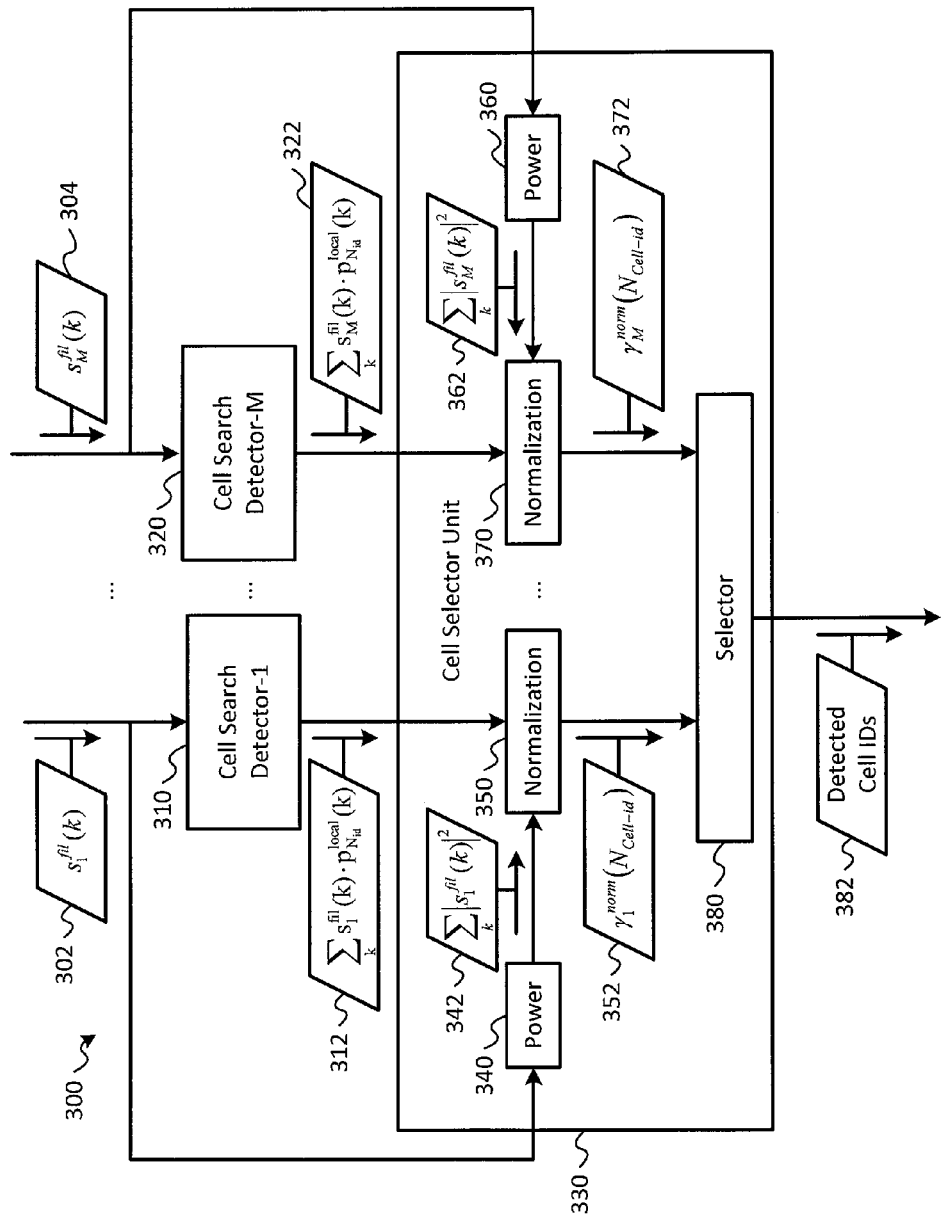
FIG. 3 is a block diagram illustrating exemplary aspects of detecting and selecting physical network identities during a cell search performed using multiple spatial filters.
Figure 4:
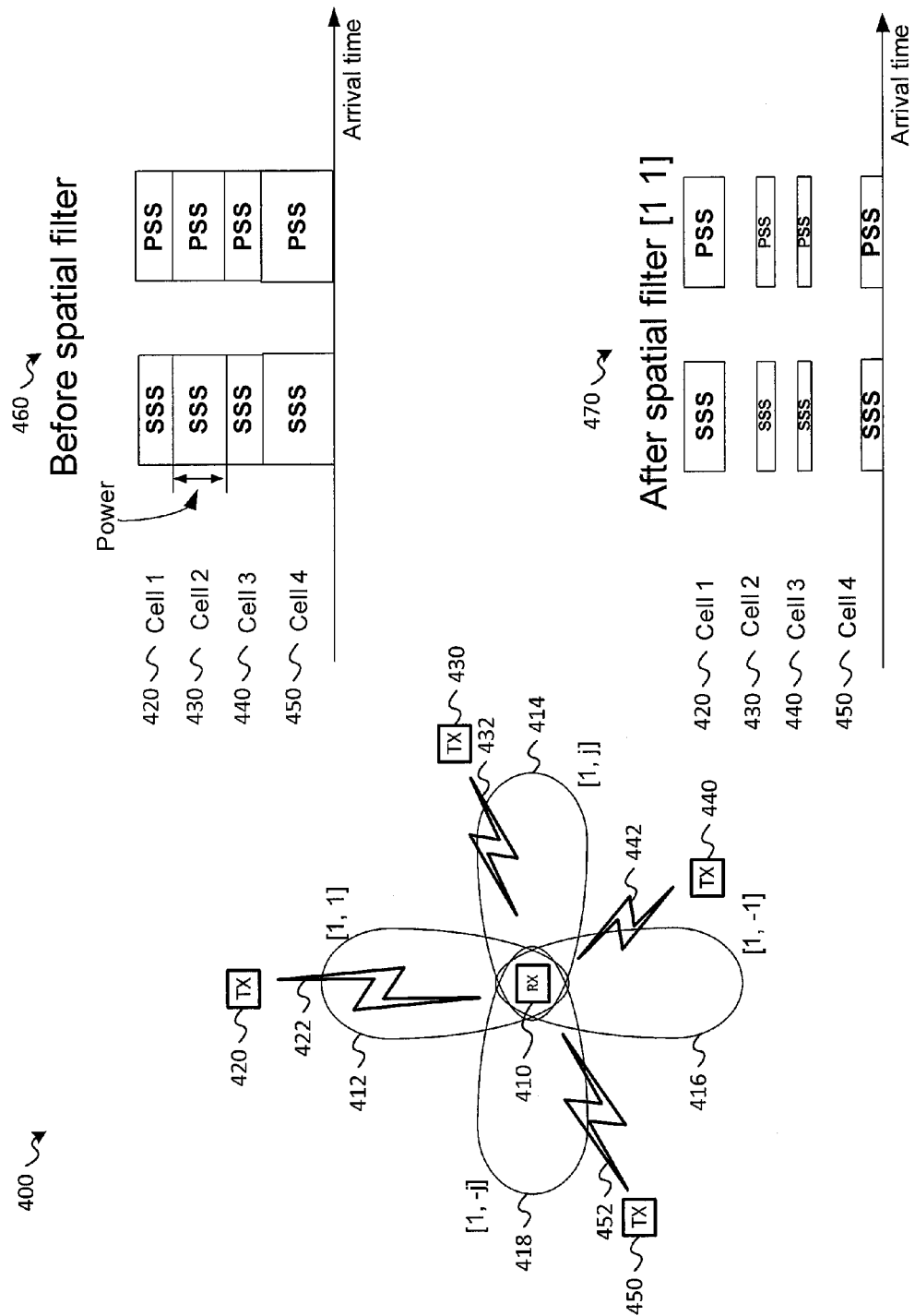
FIG. 4 is a system diagram illustrating exemplary aspects of using a plurality of predefined weighted spatial filters to perform a cell search in a multiple antenna wireless system.

As described further with reference to FIGS. 2-4, the set of predefined spatial filters ($W_{pre}$) may be used to increase the number of cells detected by the electronic device 100, such as during a cell search performed by a mobile communication device attempting to join a wireless communication network, or during cell search performed by a base station joining a SON or another type of ad hoc network. Each of the spatial filters included in the set of predefined spatial filters ($W_{pre}$) may be applied to the signal streams $s_i(k)$ separately, as described in more detail below with reference to the spatial filter unit 150 and the cell search detector unit 160, and as described further with reference to FIGS. 2-4.

In an additional or alternative aspect, the filter generator unit 140 may be configured to weight the plurality of spatial filters based on a dynamically determined set of filter weights. For example, as shown in FIG. 1, the filter generator unit 140 may include a correlation estimator 142 and a weight generator 144. The correlation estimator 142 may be configured to generate a correlation matrix (R) representative of the correlation between signals received by the plurality of antennas 130. In an aspect, the correlation matrix (R) may be generated over time and may be given by:

$$R = \begin{bmatrix} 1 & r_{2,1} \\ r_{1,2} & 1 \end{bmatrix},$$

where the plurality of antennas 130 includes 2 antennas (e.g., N=2), $r_{1,2}$ and $r_{2,1}$ represent the correlation between the signals received at the 2 antennas, $r_{i,j}=E[s_i*s_j]$, where $s_i$ and $s_j$ correspond to signals received at the i-th and j-th antennas, $*s_j$ represents the conjugate of $s_j$, and E indicates the signals are sampled over time.

The weight generator 144 may be configured to generate a rotation matrix ($F_{rotate}$) based on the correlation matrix (R). In an aspect, the rotation matrix ($F_{rotate}$) may be defined as:

$$F_{rotate} = \begin{bmatrix} \frac{r_1}{\|r_1\|} & & 0 \\ & \ddots & \\ 0 & & \frac{r_N}{\|r_N\|} \end{bmatrix},$$

where $F_{rotate}$ is a diagonal matrix with non-zero diagonal entries, $r_n$ denotes the n-th element of a vector (r) selected from the correlation matrix, and $\|r_n\|$ denotes the norm of $r_n$.

The rotation matrix ($F_{rotate}$) may be used to generate a set of adaptive spatial filters ($W_{adp}$) by rotating the set of predefined spatial filters ($W_{pre}$). The rotation of the set of predefined spatial filters to generate the set of adaptive spatial filters ($W_{adp}$) may be given by:

$$W_{adp} = W_{pre} \cdot F_{rotate} = \begin{bmatrix} 1 & 1 \\ 1 & -1 \\ 1 & j \\ 1 & -j \end{bmatrix} \cdot \begin{bmatrix} 1 & 0 \\ 0 & \frac{r_{1,2}}{\|r_{1,2}\|} \end{bmatrix} = \begin{bmatrix} 1 & \frac{r_{1,2}}{\|r_{1,2}\|} \\ 1 & -\frac{r_{1,2}}{\|r_{1,2}\|} \\ 1 & j \cdot \frac{r_{1,2}}{\|r_{1,2}\|} \\ 1 & -j \cdot \frac{r_{1,2}}{\|r_{1,2}\|} \end{bmatrix}.$$

Figure 5:
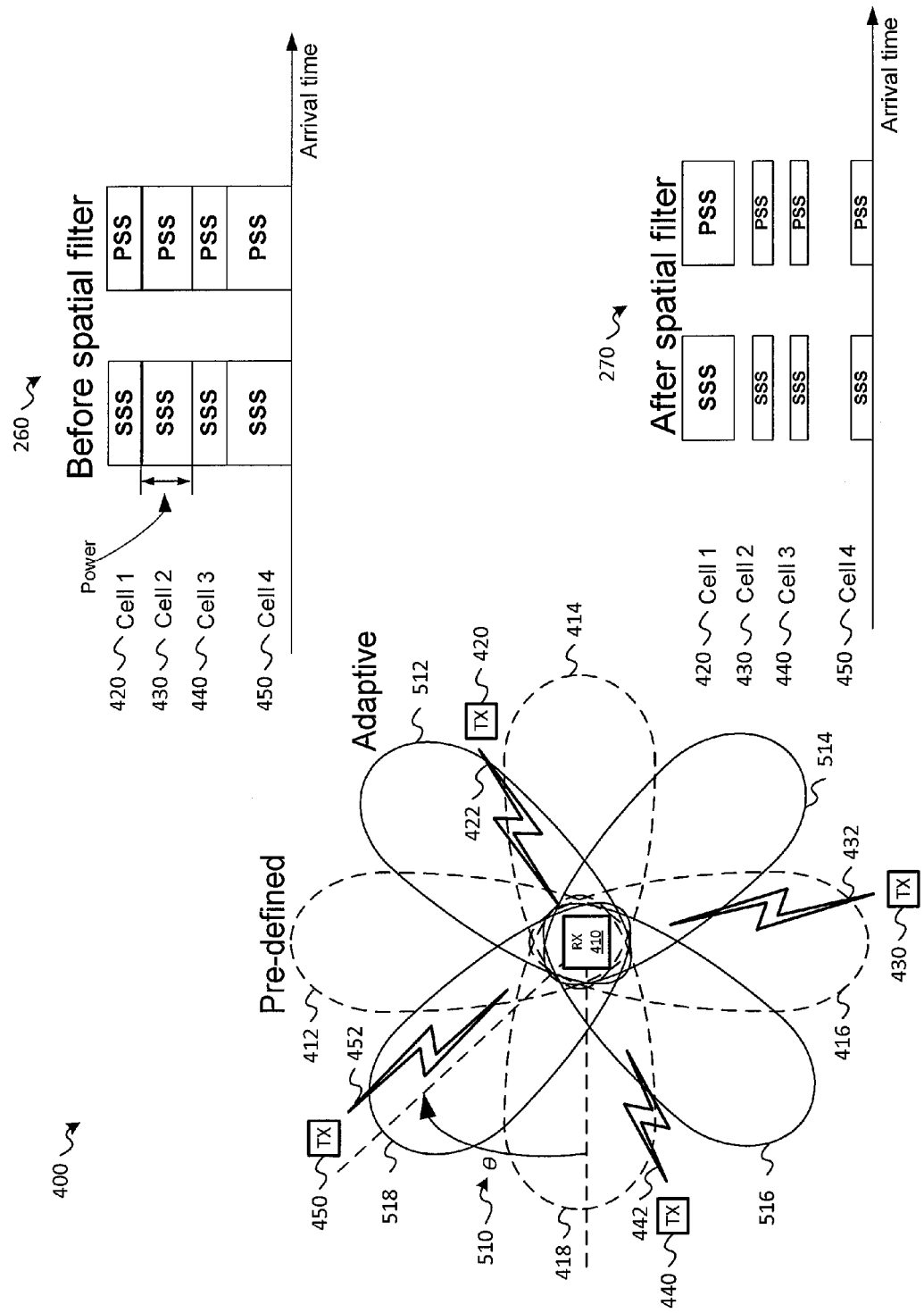
FIG. 5 is a system diagram illustrating exemplary aspects of using a plurality of adaptive weighted spatial filters to perform a cell search in a multiple antenna wireless system.

The set of adaptive spatial filters ($W_{adp}$) may include a first spatial filter configured to strengthen signals in a first direction, a second spatial filter configured to suppress signals in a second direction, and the remaining spatial filters may be configured to cover a space between first and second spatial filters, as described further with reference to FIG. 5.

As described further with reference to FIGS. 2, 3, and 5, the set of adaptive spatial filters ($W_{adp}$) may be used to increase the number of cells detected by the electronic device 100, such as during a cell search performed by a mobile communication device attempting to join a wireless communication network, or during a cell search performed by a base station joining a SON or another type of ad hoc network. Each of the adaptive spatial filters included in the set of adaptive spatial filters ($W_{adp}$) may be applied separately, as described in more detail below with reference to the spatial filter unit 150 and the cell search detector unit 160, and as described further with reference to FIGS. 2, 3, and 5.

The spatial filter unit 150 may be configured to apply each of the spatial filters included in the set of predefined spatial filters ($W_{pre}$), or each the spatial filters included in the set of adaptive spatial filters ($W_{adp}$) to the signals received at each of the plurality of antennas 130. For example, the plurality of antennas 130 may receive a plurality of signals (s) from a plurality of signal sources (e.g. other cells or base stations).

The plurality of signals (s) may be provided to spatial filters included in the spatial filter unit 150 as a plurality of signal streams $s_N(k)$, where N corresponds to the number of antennas included in the plurality of antennas 130, and $s_i(k)$, for i=1 to N and N≥2, represents a signal stream generated based on signals received at the i-th antenna of the plurality of antennas 130.

To illustrate, when N=2, the first spatial filter 152 and the M-th spatial filter 154 may each receive a first signal stream $s_1(k)$ from a first antenna of the plurality of antennas, and a second signal stream $s_2(k)$ from a second antenna of the plurality of antennas 130. The first spatial filter 152 may apply a first spatial filter (e.g., a first row of $W_{pre}$, or $W_{adp}$) and the M-th spatial filter 154 may apply an M-th spatial filter (e.g., an M-th row of $W_{pre}$, or $W_{adp}$) to the received signals streams (e.g., $s_1(k)$ and $s_2(k)$) to weighted combine the signal streams and generate a first filtered signal stream and an M-th filtered signal stream, respectively. In an aspect, the filtered signal streams generated by the weighted combining of the first signal stream $s_1(k)$ and the second signal stream $s_2(k)$ by the spatial filters 152, 154 of the spatial filter unit 150 may be given by:

$$\begin{bmatrix} s_1^{fil}(k) \\ \cdots \\ s_M^{fil}(k) \end{bmatrix} = \begin{bmatrix} w_{1,1} & \cdots & w_{1,N} \\ \cdots & \cdots & \cdots \\ w_{M,1} & \cdots & w_{M,N} \end{bmatrix} \cdot \begin{bmatrix} s_1(k) \\ \cdots \\ s_N(k) \end{bmatrix},$$

where $s_1^{fil}(k)$ corresponds to the filtered signal stream generated by the first spatial filter 152, $s_M^{fil}(k)$ corresponds to the filtered signal stream generated by the M-th spatial filter 154, and where $$\begin{bmatrix} w_{1,1} & \cdots & w_{1,N} \\ \cdots & \cdots & \cdots \\ w_{M,1} & \cdots & w_{M,N} \end{bmatrix}$$

corresponds to the set of weights {w̃ m,n} used to weight the spatial filters.

The weighted combining of the signal streams by a particular spatial filter of the spatial filter unit 150 to generate a particular one of the filtered signal streams may be given by:

$$s_m^{fil} = [w_{1,1} \ \cdots \ w_{m,N}] \cdot \begin{bmatrix} s_1(k) \\ \cdots \\ s_N(k) \end{bmatrix},$$

where m is between 1 and M, M corresponds to the number of spatial filters, N corresponds to the number of antennas included in the plurality of antennas, $[w_{1,1} \ \cdots \ w_{m,N}]$ represents a row of the set of spatial filters (e.g., the m-th row of $W_{pre}$ or $W_{adp}$), and $$\begin{bmatrix} s_1(k) \\ \cdots \\ s_N(k) \end{bmatrix}$$

represents the signal streams provided to the particular spatial filter (m).

The filtered signal streams may be provided to corresponding cell search detectors included in the cell search detector unit 160. For example, as shown in FIG. 1, the cell search detector unit 160 includes a plurality of cell search detectors including a first cell search detector 162 (labeled "Cell Search Detector-1" in FIG. 1) and an M-th cell search detector 164 (labeled "Cell Search Detector-M" in FIG. 1). The number of cell search detectors included in the cell search detector unit 160 may be equal to the number of spatial filters included in the spatial filter unit 150, and each of the cell search detectors included in the cell search detector unit 160 may correspond to one of the spatial filters included in the spatial filter unit 150. For example, the first cell search detector 162 may correspond to the first spatial filter 152 and the M-th cell search detector 164 may correspond to the M-th spatial filter 154, and so on.

Each of the spatial filters included in the spatial filter unit 150 may provide a filtered signal stream to a corresponding cell search detector included in the cell search detector unit 160. For example, the first spatial filter 152 may correspond to the first cell search detector 162 and may provide a first filtered signal stream $s_1^{fil}$ to the first cell search detector 162, and the M-th spatial filter 152 may correspond to the M-th cell search detector 164 and may provide an M-th filtered signal stream $s_M^{fil}$ to the M-th cell search detector 162.

Each of the cell search detectors included in the cell search detector unit 160 may be configured to determine a correlation between a respective filtered signal stream and local sequences, where the correlation is representative of timing synchronization between the respective filtered signal stream and the local sequences. The local sequences may be specified by physical network identities. For example, each cell search detector may determine a correlation between a filtered signal stream received from a corresponding spatial filter and a plurality of local sequences. The cell search detectors may select a particular local sequence of the plurality of local sequences based on the correlation between the filtered signal stream and the plurality of local sequences. The particular local sequence may be selected based on a magnitude of the correlation between the filtered signal stream and the particular local sequence being greater than a magnitude of the correlation between the filtered signal stream and other local sequences of the plurality of local sequences, where the magnitude of the correlation between the signal stream and each of the plurality of local sequences may be representative of how closely time synchronized the filtered signal stream is to each of the plurality of local sequences.

The cell search detectors may be configured to provide the correlation between the filtered signal stream and the particular local sequence to the cell selector unit 170. In an aspect, the correlation between the filtered signal stream and the particular local sequence may be given by:

$$\Sigma_k s_m^{fil}(k) \cdot p_{N_{Cell-id}}^{local}(k),$$

where m is between 1 and M, M corresponds to the number of cell search detectors, $s_m^{fil}(k)$ is the filtered signal stream generated by the m-th spatial filter, and $p_{N_{Cell-id}}^{local}(k)$ is the particular local sequence selected by m-th cell search detector.

The filtered signal streams may be provided from the spatial filters of the spatial filter unit 150 to the cell selector unit 170, and the correlations between the filtered signal streams and the selected local sequences may be provided from the cell search detectors of the cell search detector unit 160 to the cell selector unit 170. The cell selector unit 170 may be configured to determine a normalized correlation power of each of the filtered signal streams based on the correlation between each of the filtered signal streams and a particular local sequence $p_{N_{Cell-id}}^{local}(k)$ and to detect physical network identities of neighbor cells based on the normalized correlation power of each of the filtered signal streams.

For example, the first spatial filter 152 may provide the first filtered signal stream $s_1^{fil}(k)$ to the cell selector unit 170 and the first cell search detector 162 may provide a correlation $\Sigma_k s_1^{fil}(k) \cdot p_{N_{Cell-id}}^{local}(k)$ between the first filtered signal stream $s_1^{fil}(k)$ and a local sequence $p_{N_{Cell-id}}^{local}(k)$ to the cell selector unit 170. The cell selector unit 170 may determine the power of the first filtered signal stream $s_1^{fil}(k)$. The power of the first filtered signal stream $s_1^{fil}(k)$ may be given by:

$$\Sigma_k |s_1^{fil}(k)|^2.$$

The cell selector unit 170 may then determine the normalized correlation power of the first filtered signal stream $s_1^{fil}(k)$ based on the power of the first filtered signal stream and the correlation between the first filtered signal stream $s_1^{fil}(k)$ and a local sequence $p_{N_{Cell-id}}^{local}(k)$. The normalized correlation power of the first filtered signal stream $s_1^{fil}(k)$ may be given by:

$$\gamma_1^{norm}(N_{Cell-id}) = \frac{\left|\sum_k s_1^{fil}(k) \cdot p_{N_{Cell-id}}^{local}(k)\right|^2}{\sum_k |s_1^{fil}(k)|^2}.$$

The cell selector unit 170 may be configured to determine one or more physical network identities based on the normalized correlation power of each of the signal streams and the local sequence. For example, the cell selector unit 170 may select a particular physical network identity associated with a highest normalized correlation power $\gamma_m^{norm}(N_{Cell-id})$ for a particular filtered signal stream. Stated another way, the cell selector unit 170 may select a particular physical network identity associated with a highest normalized correlation power for each of the filtered signal streams generated by the spatial filter unit 150. It is noted that in some aspects, the network identity associated with the highest normalized correlation power may be the same for multiple filtered signal streams. Thus, the cell selector unit 170 may select one or more physical network identities based on the normalized correlation power of the M filtered signal streams generated by the M spatial filters of the spatial filter unit 150. A particular selected physical network identity of the one or more selected physical network identities may correspond to a cell that is in the direction of the spatial filter m (e.g., the m-th row of $W_{pre}$, or $W_{adp}$). Normalizing the power of the filtered signal streams prior to detecting the physical network identities may increase the reliability and accuracy of the physical network identities detected based on the filtered signal streams output from the spatial filters of the spatial filter unit 150. For example, interference from a strong cell may skew the power of particular ones of the filtered signal streams (such as filtered signal streams associated with weaker cells), which may skew or otherwise introduce error into the correlations determined by the cell search detectors of the cell search detector unit 160.

In an aspect, the cell selector unit 170 may be configured to regenerate signals associated with the detected physical network identities. The regenerated signals may be representative of synchronization signals generated by one or more signal sources (e.g., neighboring cells) that correspond to the determined one or more physical network identities. The regenerated signals may be provided to a canceller (not shown in FIG. 1) that may cancel the regenerated signals from the filtered signal streams generated by the spatial filter unit 150. Thus, during a subsequent iteration of the cell search operation performed by the electronic device 100, the signals received from detected cells may be canceled, enabling detection of additional cells that may have weaker signal strength than the detected cells. In this way, the electronic device 100 may identify a greater number of neighboring cells proximate to (e.g., within communication range of) the electronic device 100. This may be beneficial when the electronic device 100 is a base station joining a SON as it may reduce a likelihood that the electronic device 100 will select a physical network identity that is already in use by another base station within the SON, and may also prevent or reduce a likelihood that the electronic device 100 would transmit signals that cause collisions with the other base station (e.g., because transmissions within the network are time synchronized).

Additional illustrative aspects of using a plurality of spatial filters to perform cell detection (e.g., detect physical network identities) and/or to select a physical network identity are described with reference to FIGS. 2-5. It is noted that the formulas described with reference to FIG. 1 have been provided for purposes of illustration, rather than by way of limitation, and other techniques, formulas, and processes may be used to generate the spatial filters, weight the spatial filters, rotate the spatial filters, etc.

Referring to FIG. 2, a block diagram illustrating exemplary aspects of generating weighted spatial filters for performing a cell search using multiple spatial filters is shown. In FIG. 2, N receive antennas, M weighted spatial filters, a filter generator, M cell search detectors, and a cell selector unit 280 are shown. The N receive antennas include a first receive antenna 210, . . . , and an N-th receive antenna 220. In an aspect, the N receive antennas may be the plurality of antennas 130 of FIG. 1. The M weighted spatial filters include a first weighted spatial filter 230, . . . , and an M-th weighted spatial filter 240. In an aspect, the M weighted spatial filters may be the plurality of spatial filters included in the spatial filter unit 150 of FIG. 1. The M cell search detectors include a first cell search detector 260 (labeled "Cell Search Detector-1"), . . . , and an M-th cell search detector 270 (labeled "Cell Search Detector-M"). In an aspect, the M cell search detectors may be the plurality of cell search detectors included in the cell search detector unit 160 of FIG. 1. In an aspect, the cell selector unit 280 may be the cell search selector unit 170 of FIG. 1. Further, the filter generator 250 includes a correlation estimator 252 and a weight generator 256. In an aspect, the filter generator 250 may be the filter generator unit 140 of FIG. 1, the correlation estimator 252 may be the correlation estimator 142 of FIG. 1, and the weight generator 256 may be the weight generator 144 of FIG. 1.

During operation, the N receive antennas may receive signals from a plurality of signal sources (e.g., neighboring cells), and may provide a signal stream corresponding to the received signals to each of the M spatial filters and the filter generator 250. For example, as shown in FIG. 2, the first receive antenna 210 may provide a first signal stream 212 (labeled "$s_1(k)$" in FIG. 2) to the first weighted spatial filter 230, . . . , and to the M-th weighted spatial filter 240. Additionally, the first receive antenna 210 may provide the first signal stream 212 to the correlation estimator 252 of the filter generator 250. Further, the N-th receive antenna 220 may provide an N-th signal stream 222 (labeled "$s_N(k)$" in FIG. 2) to the first weighted spatial filter 230, . . . , and to the M-th weighted spatial filter 240, and may provide the N-th signal stream 222 to the correlation estimator 252 of the filter generator 250.

The correlation estimator 252 may be configured to determine a correlation matrix 254 (labeled as "R" in FIG. 2) and to provide the correlation matrix 254 to the weight generator 256. In an aspect, the correlation estimator 252 may determine the correlation matrix 254 as described with reference to FIG. 1. The correlation matrix 254 may be representative of a correlation between the signals received at the N receive antennas.

The weight generator 256 may be configured provide a set of filter weights 258 (labeled "$W_{pre}$ or $W_{adp}=f(R)$" in FIG. 2) to the M spatial filters. In an aspect, the set of filter weights 258 may be a predetermined set of filter weights {w̃ m,n} (e.g., $W_{pre}$), as described above with reference to FIG. 1. In an alternative or additional aspect, the weight generator 256 may dynamically determine the set of filter weights 258 (e.g., $W_{adp}$) based on the correlation matrix 254, as described with reference to FIG. 1.

The first weighted spatial filter 230 may apply a first weighted spatial filter to the signal streams received from the N receive antennas to generate a first filtered signal stream 232 (labeled as $s_1^{fil}(k)$ in FIG. 2), and may provide the first filtered signal stream 232 to the first cell search detector 260. The M-th weighted spatial filter 240 may apply an M-th weighted spatial filter to the signal streams received from the N receive antennas to generate an M-th filtered signal stream 242 (labeled as $s_M^{fil}(k)$ in FIG. 2), and may provide the M-th filtered signal stream 242 to the M-th cell search detector 270.

Each of the M cell search detectors may be configured to determine a correlation of a respective filtered signal stream and a local sequence, as described with reference to FIG. 1, and with further reference to FIG. 3. The correlation of the respective filtered signal streams and the local sequences may be provided to the cell search selector 280, and the cell search selector 280 may detect one or more physical network identifiers based on a normalized correlation power of the respective filtered streams, as described with reference to FIG. 1, and with further reference to FIG. 3.

As illustrated in FIG. 2, each of the M spatial filters may separately apply each of the weighted spatial filters to the signals streams. For example, the first weighted spatial filter 230 applies a first spatial filter [$w_{1,1} \ldots w_{1,N}$] to each of the signal streams $$\begin{bmatrix} s_1(k) \\ \ldots \\ s_N(k) \end{bmatrix},$$

and the M-th spatial filter 240 applies an M-th spatial filter [$w_{M,1} \ldots w_{M,N}$] to each of the signal streams $$\begin{bmatrix} s_1(k) \\ \ldots \\ s_N(k) \end{bmatrix}.$$

In an aspect, the cell selector 280 may select M physical network identities (e.g., one physical network identity for each of filtered signal streams generated by the M spatial filters). Additional illustrative aspects of selecting physical network identities for each of the M spatial filters are described with reference to FIGS. 3-5.

Referring to FIG. 3, a block diagram illustrating exemplary aspects of detecting and selecting physical network identities during a cell search performed using multiple spatial filters is shown. In FIG. 3, M cell search detectors, and a cell selector unit 330 are shown. The M cell search detectors include a first cell search detector 310 (labeled "Cell Search Detector-1"), . . . , and an M-th cell search detector 320 (labeled "Cell Search Detector-M"). In an aspect, the M cell search detectors may be the plurality of cell search detectors included in the cell search detector unit 160 of FIG. 1 and/or may be the M cell search detectors described with reference to FIG. 2 (e.g., the first cell search detector 260, . . . , and the M-th cell search detector 240 of FIG. 2). In an aspect, the cell selector unit 330 may be the cell search selector unit 170 of FIG. 1 and/or may be the cell selector unit 280 of FIG. 2.

As shown in FIG. 3, a first filtered signal stream 302 (labeled as "$s_1^{fil}(k)$" in FIG. 3) may be provided to the first cell search detector 310, . . . , and an M-th filtered signal stream 304 (labeled as "$s_M^{fil}(k)$" in FIG. 3) may be provided to the M-th cell search detector 320. In an aspect, the first filtered signal stream 302 may be the first signal stream 232 of FIG. 2, and the M-th filtered signal stream 304 may be the M-th filtered signal stream 242 of FIG. 2. Each of the M cell search detectors may be configured to determine a correlation between a received filtered signal stream and local sequences specified by physical network identities, as described with reference to FIG. 1, and may provide the correlations to the cell selector unit 330. For example, the first cell search detector 310 may determine a correlation 312 (labeled "$\Sigma_k s_1^{fil}(k) \cdot p_{N_{Cell\text{-}id}}^{local}(k)$" in FIG. 3) between the first filtered signal stream 302 and the local sequences, . . . , and the M-th cell search detector unit 320 may determine a correlation 322 (labeled as "$\Sigma_k s_1^{fil}(k) \cdot p_{N_{Cell\text{-}id}}^{local}(k)$" in FIG. 3) between the M-th filtered signal stream 304 and the local sequences.

As shown in FIG. 3, the cell selector unit 330 includes M power units configured to determine a power of respective ones of the filtered signals streams, and includes M normalization units configured to determine a normalized correlation power of the respective ones of the filtered signal streams. The M power units include a first power unit 340, . . . , and an M-th power unit 360, and the M normalization units include a first normalization unit 350, . . . , and an M-th normalization unit 370.

The first filtered signal stream 302 may be provided to the first power unit 340, . . . , and the M-th signal stream 304 may be provided to the M-th power unit 360. The first power unit 340 may determine a power 342 (labeled "$\Sigma_k |s_1^{fil}(k)|^2$" in FIG. 3) of the first filtered signal stream 302, . . . , and the M-th power unit 360 may determine a power 362 (labeled as "$\Sigma_k |s_M^{fil}(k)|^2$" in FIG. 3) of the M-th filtered signal stream 304, as described with reference to FIG. 1.

The first normalization unit 350 may receive the power 342 from the first power unit 340, and may receive the correlation 312 from the first cell search detector 310, . . . , and the M-th normalization unit 370 may receive the power 362 from the M-th power unit 360 and may receive the correlation 322 from the M-th cell search detector 320, as described with reference to FIG. 1. The first normalization unit 350 may be configured to determine a normalized correlation power 352 (labeled as "$\gamma_1^{norm}(N_{Cell\text{-}id})$" in FIG. 3) of the first signal stream 304 based on the power 342 and the correlation 312, and the M-th normalization unit 370 may be configured to determine a normalized correlation power 372 (labeled as "$\gamma_M^{norm}(N_{cell\text{-}id})$" in FIG. 3) of the M-th signal stream 304 based on the power 342 and the correlation 322.

The normalized correlation power 352, 372 may be provided to a selector 380. The selector 380 may be configured to select a particular local sequence based on a magnitude of the normalized correlation power of the respective filtered signal streams and the local sequences specified by physical network identities, where the particular local sequence selected based on the normalized correlation power of a particular filtered signal stream indicates that a particular physical network identity has been detected using a corresponding spatial filter (e.g., one of the M spatial filters that generated the particular filtered signal stream). Stated another way, the selector 380 may be configured to select a particular physical network identity corresponding to a neighboring cell detected using a particular one of the M spatial filters. Furthermore, as explained above with reference to FIG. 1, the magnitude of the normalized correlation power may be representative of how closely time synchronized the respective filtered signal streams are to particular local sequences of the plurality of local sequences Additional aspects of detecting neighboring cells using M spatial filters are described with reference to FIGS. 4 and 5. The detected physical network identities may be output as one or more detected cell identifiers 382. In an aspect, the one or more detected physical network identities may be provided to a processor (e.g., the processor 110 of FIG. 1), and the processor may determine whether to continue the cell search or to initiate an operation (e.g., initiate a handover to a particular neighboring cell based on the detected physical network identities, select a particular physical network identity to be used to join a SON, etc.) In some aspects, the cell search may continue and signals (e.g., synchronization signals) associated with the detected physical network identities may be regenerated and canceled from the filtered signal streams generated by the M spatial filters to detect additional physical network identities (e.g., physical network identities of weaker neighboring cells). The cell search may end when no additional physical network identities are detected in response to cancellation of the signals generated based on the detected physical network identities, or upon some other criterion, such as upon performing a threshold number of cell search iterations or upon detecting a threshold number of physical network identities.

Referring to FIG. 4, a system diagram illustrating exemplary aspects of using a plurality of predefined weighted spatial filters to perform a cell search in a multiple antenna wireless system is shown as a system 400. As shown in FIG. 4, the system 400 includes a receiver 410, a first neighboring cell 420, a second neighboring cell 430, a third neighboring cell 440, and a fourth neighboring cell 450. In an aspect the receiver 410 may be the electronic device 100 of FIG. 1, and may be configured to perform the operations described in connection with FIGS. 1-3 with reference to performing a cell search using multiple antennas. The receiver 410 may include a plurality of receive antennas (e.g., the plurality of antennas 130 of FIG. 1 or the N receive antennas of FIG. 2).

The first neighboring cell 420 may transmit a first signal 422, the second neighboring cell 430 may transmit a second signal 432, the third neighboring cell 440 may transmit a third signal 442, and the fourth neighboring cell 450 may transmit a fourth signal 452. The signals 422, 432, 442, 452 may be received at the plurality of receive antennas of the receiver 410. The receiver 410 may apply a plurality of spatial filters that have been weighting using a predetermined set of filter weights (e.g., the set of predetermine filter weights {w̃ m,n} described with reference to FIG. 1). For example, in FIG. 4, the plurality of spatial filters may be given by:

$$W_{pre4\times 2} = \begin{bmatrix} 1 & 1 \\ 1 & j \\ 1 & -1 \\ 1 & -j \end{bmatrix},$$

as described with reference to FIG. 1.

In the upper right of FIG. 4, powers of the signals 422, 432, 442, 452 before the application of the spatial filter according to aspects of the present disclosure are shown for each of the neighboring cells 420, 430, 440, 450. As can be seen in FIG. 4, the signal 452 transmitted by the fourth neighboring cell 450 has a highest power. During a cell search, the receiver 410 may apply a first spatial filter [1 1] the a signal stream to weighted combine the signals 422, 432, 442, 452, as described with reference to FIGS. 1 and 2, to facilitate reception of signals from a first direction, indicated in FIG. 4 as a beam 412. The first spatial filter may be configured to strengthen signals received from the direction indicated by the beam 412, and one of the other spatial filters (e.g., [1 j], [1 −1], or [1 −j]) may be configured to suppress signals from a particular direction (e.g., the directions indicated by the beams 414, 416, 418, respectively), while the remaining spatial filters may be configured to fill in the space between the first spatial filter and the other spatial filter. In the lower right of FIG. 4, the powers of the signals 422, 432, 442, 452 after application of the first spatial filter are shown. As can be seen, application of the first spatial filter to the signals 422, 432, 442, 452 reduces the strength of signals (e.g., the signals 432, 442, 452) received from the directions indicated by the beams 414, 416, 418, while strengthening the signals (e.g., the signal 422) received from the direction indicated by the beam 412.

The receiver 410 may include a cell selector unit (e.g., the cell selector unit 170 of FIG. 1, the cell selector unit 280 of FIG. 2, or the cell selector unit of FIG. 3) configured to select a physical network identity for a filtered signal stream generated by the first spatial filter. As shown by the power of the signals after application of the first spatial filter, the cell selector unit may select a physical network identity corresponding to the first neighboring cell 420.

It is to be appreciated that application of other spatial filters may result in selections of other physical network identities. For example, a second spatial filter [1 j] may weighted combine the signals 422, 432, 442, 452 to generate a second signal stream, as described with reference to FIGS. 1 and 2, that may facilitate reception of (and strengthening of) signals from a direction indicated by the beam 414, while one of the remaining spatial filters suppresses signals from a particular direction (e.g., a direction other than the direction indicated by the beam 414). The remaining spatial filters may be configured to fill in the space between the second spatial filter and the other spatial filter. Application of the second spatial filter may reduce the strength of signals (e.g., the signals 422, 442, 452) received from the directions indicated by the beams 412, 416, 418, while strengthening the signals (e.g., the signal 432) received from the direction indicated by the beam 414. For the second signal stream generated by the second spatial filter, the cell selector may select a physical network identity corresponding to the second neighboring cell 430. Thus, it can be seen from FIG. 4 that using a plurality of weighted spatial filters to detect physical network identities during a cell search may improve detection of neighboring cells. Additionally, it can be seen that, by using four spatial filters weighted as shown in FIG. 4, a multi-dimensional space may be divided into four spatial groups, each spatial group covered by a respective one of the beams 412, 414, 416, 418.

Referring to FIG. 5, a system diagram illustrating exemplary aspects of using a plurality of adaptive weighted spatial filters to perform a cell search in a multiple antenna wireless system is shown as a system 400. In FIG. 5, the system 400 of FIG. 4 is shown and includes the receiver 410, the first neighboring cell 420, the second neighboring cell 430, the third neighboring cell 440, and the fourth neighboring cell 450.

The first neighboring cell 420 may transmit the first signal 422, the second neighboring cell 430 may transmit the second signal 432, the third neighboring cell 440 may transmit the third signal 442, and the fourth neighboring cell 450 may transmit the fourth signal 452. The signals 422, 432, 442, 452 may be received at the plurality of receive antennas of the receiver 410. During a cell search, the receiver 410 may apply a plurality of adaptive spatial filters to the signals 422, 432, 442, 452, as described with reference to FIG. 1 to detect physical network identities of neighboring cells. The plurality of adaptive filters may be generated based on a correlation matrix (e.g., the correlation matrix (R) described with reference to FIG. 1) representative of a correlation between the signals 422, 432, 442, 452 and the plurality of receive antennas of the receiver 410 and a rotation matrix (e.g., the rotation matrix $F_{rotate}$ described with reference to FIG. 1). As can be seen in FIG. 5, the beams 412, 414, 416, 418 associated with the predefined spatial filters have been rotated (e.g., by an angle 510) using the rotation matrix to generate adaptive beams. For example, rotation of the beam 412 is represented by an adaptive beam 512, rotation of the beam 414 is represented by an adaptive beam 514, rotation of the beam 416 is represented by an adaptive beam 516, and rotation of the beam 418 is represented by an adaptive beam 518.

In the upper right of FIG. 5, powers of the signals 422, 432, 442, 452 before the application of adaptive spatial filters according to aspects of the present disclosure are shown for each of the neighboring cells 420, 430, 440, 450. As can be seen in FIG. 4, the signal 452 transmitted by the fourth neighboring cell 450 has a highest power. In an aspect, the rotation matrix may be configured to rotate the predefined spatial filters such that the rotation of the predefined spatial filters causes a first adaptive filter to suppresses signals from a first direction (e.g., the direction indicated by the beam 518), and strengthens signals from second direction (e.g., the direction indicated by the beam 512), and the remaining adaptive spatial filters cover the directions (e.g., the directions indicated by the beams 514, 516) between the first direction and the second direction.

During a cell search, the receiver 410 may apply a first adaptive spatial filter to a signal stream to weighted combine the signals 422, 432, 442, 452, as described with reference to FIGS. 1 and 2, to facilitate reception of signals from a first direction, indicated in FIG. 5 as the beam 512, while reducing the strength of signals from other directions, such as the directions indicated by the beams 514, 516, 518. In the lower right of FIG. 5, the powers of the signals 422, 432, 442, 452 after application of the first adaptive spatial filter are shown. As can be seen, the first adaptive spatial filter reduces the strength of the signals (e.g., the signals 432, 442, 452) received from the directions indicated by the beams 514, 516, 518, while strengthening the signals (e.g., the signal 422) received from the direction indicated by the beam 512.

The receiver 410 may include a cell selector unit (e.g., the cell selector unit 170 of FIG. 1, the cell selector unit 280 of FIG. 2, or the cell selector unit of FIG. 3) configured to select a physical network identity for a filtered signal stream generated by the first adaptive spatial filter. As shown by the power of the signals after application of the first adaptive spatial filter, the cell selector unit may select a physical network identity corresponding to the first neighboring cell 420.

It is to be appreciated that application of other adaptive spatial filters may result in selections of other physical network identities. For example, a second adaptive spatial filter may weighted combine the signals 422, 432, 442, 452 to generate a second signal stream, as described with reference to FIGS. 1 and 2, that may be used to facilitate reception of, and strengthening of signals received from the direction indicated by the beam 514. Additionally, application of the second adaptive spatial filter may reduce the strength of signals received from other directions, such as the directions indicated by beams 512, 516, 518. For the second signal stream generated by the second adaptive spatial filter, the cell selector may select a physical network identity corresponding to the second neighboring cell 430. Thus, it can be seen from FIG. 5 that using a plurality of adaptive spatial filters to detect physical network identities to perform a cell search may improve detection of neighboring cells. Additionally, by rotating the predefined spatial filters to generate the adaptive spatial filters, a number of physical network identities detected may be increased, thereby increasing the number of detected neighbor cells. Furthermore, it can be seen that, by using four adaptive spatial filters weighted as shown in FIG. 5, a multi-dimensional space may be dynamically divided into four spatial groups, each spatial group covered by a respective one of the beams 512, 514, 516, 518.

Figure 6:
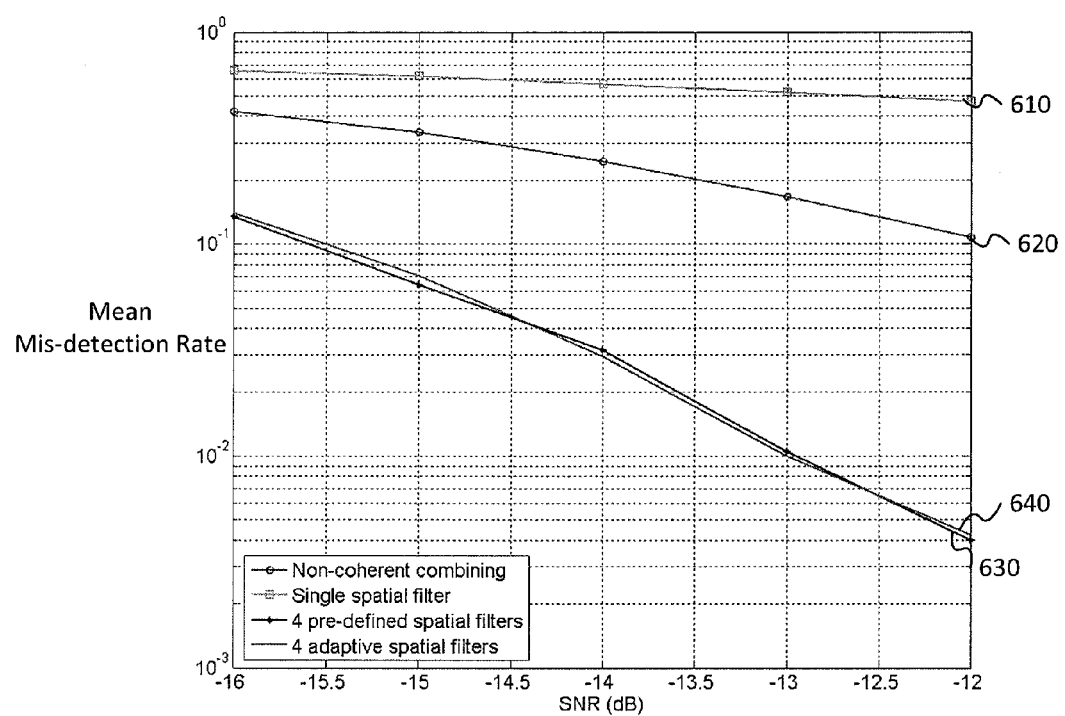
FIG. 6 is a first graph illustrating exemplary aspects of enhanced performance of cell searches utilizing a plurality of spatial filters.

Referring to FIG. 6, a first graph illustrating exemplary aspects of enhanced performance of cell searches utilizing a plurality of spatial filters is shown. As shown in FIG. 6, the graph includes a first set of data points 610 corresponding to results of a cell search using only one spatial filter, a second set of data points 620 corresponding to results of a cell search using non-coherent combining, a third set of data points 630 corresponding to results of a cell search using a plurality of predefined spatial filters according to aspects of the present disclosure, and a fourth set of data points 640 corresponding to results of a cell search using a plurality of adaptive spatial filters according to aspects of the present disclosure. The data points were generated during a simulation of cell searches performed by a receiver including 2 receive antennas in a system that included 8 neighbor cells transmitting signals at equal power with a random arrival angle. As can be seen in FIG. 6, the cell searches performed using the plurality of predefined spatial filters and the plurality of adaptive spatial filters provide improved performance (e.g., reduced mean misdetection rate and a 3.5 dB gain) relative to the cell searches performed using non-coherent combining or using only a single spatial filter.

Figure 7:
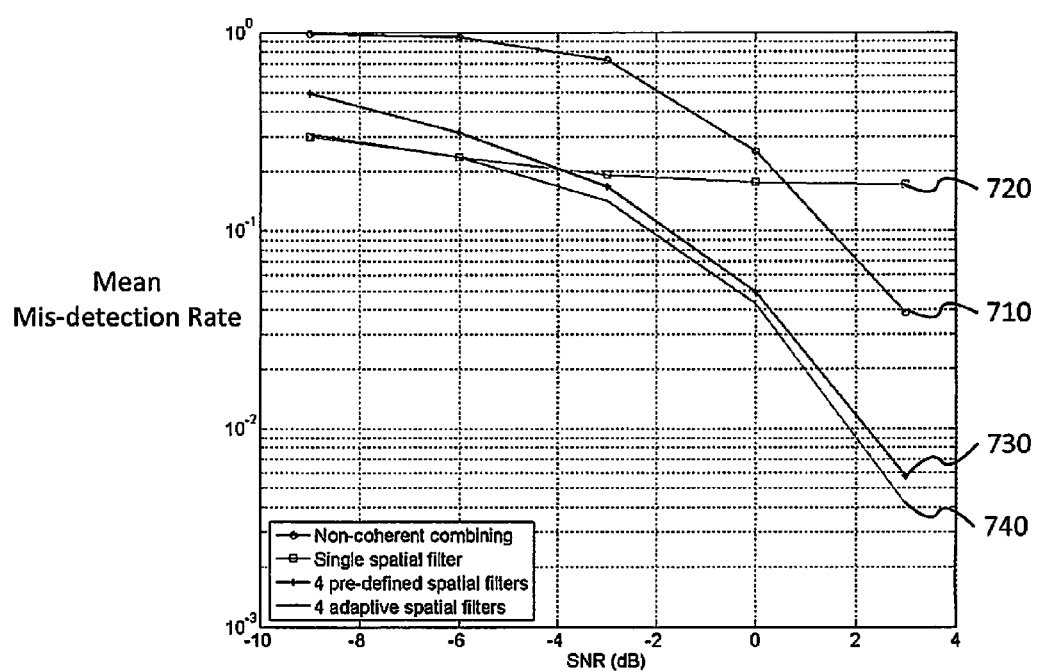
FIG. 7 is a second graph illustrating exemplary aspects of enhanced performance of cell searches utilizing a plurality of spatial filters.

Referring to FIG. 7, a second graph illustrating exemplary aspects of enhanced performance of cell searches utilizing a plurality of spatial filters is shown. As shown in FIG. 6, the graph includes a first set of data points 710 corresponding to results of a cell search using only one spatial filter, a second set of data points 720 corresponding to results of a cell search using non-coherent combining, a third set of data points 730 corresponding to results of a cell search using a plurality of predefined spatial filters according to aspects of the present disclosure, and a fourth set of data points 740 corresponding to results of a cell search using a plurality of adaptive spatial filters according to aspects of the present disclosure. The data points were generated during a simulation of cell searches performed by a receiver including 2 receive antennas in a system that included 9 neighbor cells, where 8 of the neighbor cells were weak cells transmitting signals at equal power with a random arrival angle, and where 1 of the neighbor cells was a strong cell transmitting a signal at 15 dB higher power than the weak cells and having a random arrival angle. As can be seen in FIG. 7, the cell searches performed using the plurality of predefined spatial filters and the plurality of adaptive spatial filters provide improved performance (e.g., reduced mean misdetection rate and a 3.5 dB gain) relative to the cell searches performed using non-coherent combining or using only a single spatial filter. Additionally, as shown in FIG. 7, an error floor exists when only a single spatial filter to perform cell searches.

Figure 8:
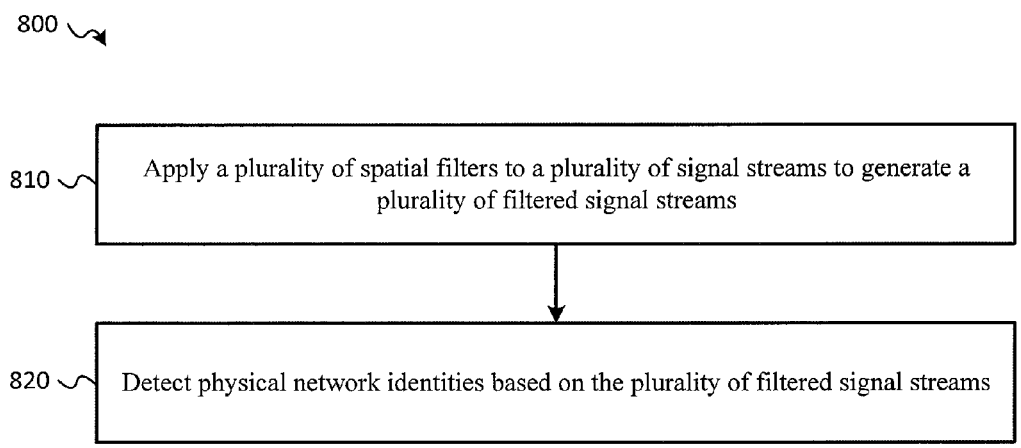
FIG. 8 is a flow chart of an exemplary method of performing a cell search in a multiple antenna wireless system using a plurality of spatial filters.

Referring to FIG. 8, a flow chart of an exemplary method of performing a cell search in a multiple antenna wireless system using a plurality of spatial filters is shown as a method 800. In an aspect, the method 800 may be performed by the electronic device 100 of FIG. 1. At 810, the method 800 includes applying a plurality of spatial filters to a plurality of signal streams to generate a plurality of filtered signal streams. The plurality of signal streams may correspond to signals received at a plurality of receive antennas from a plurality of signal sources, as described with reference to FIGS. 1 and 2. In an aspect, the plurality of spatial filters may be predefined spatial filters. In an additional or alternative aspect, the plurality of spatial filters may be adaptive spatial filters. At 820, the method 800 includes detecting physical network identities based on the plurality of filtered signal streams. In an aspect, the physical network identities may be determined based on a normalized correlation power of each of the filtered signal stream, as described with reference to FIGS. 1 and 3. As described with reference to FIGS. 1-5, and as illustrated in FIGS. 6 and 7, performing cell searches using the method 800 (e.g., using a plurality of predefined or adaptive spatial filters) provides improved performance compared to performing cell searches using other techniques (e.g., using only a single spatial filter or using non-coherent combining).

Figure 9:
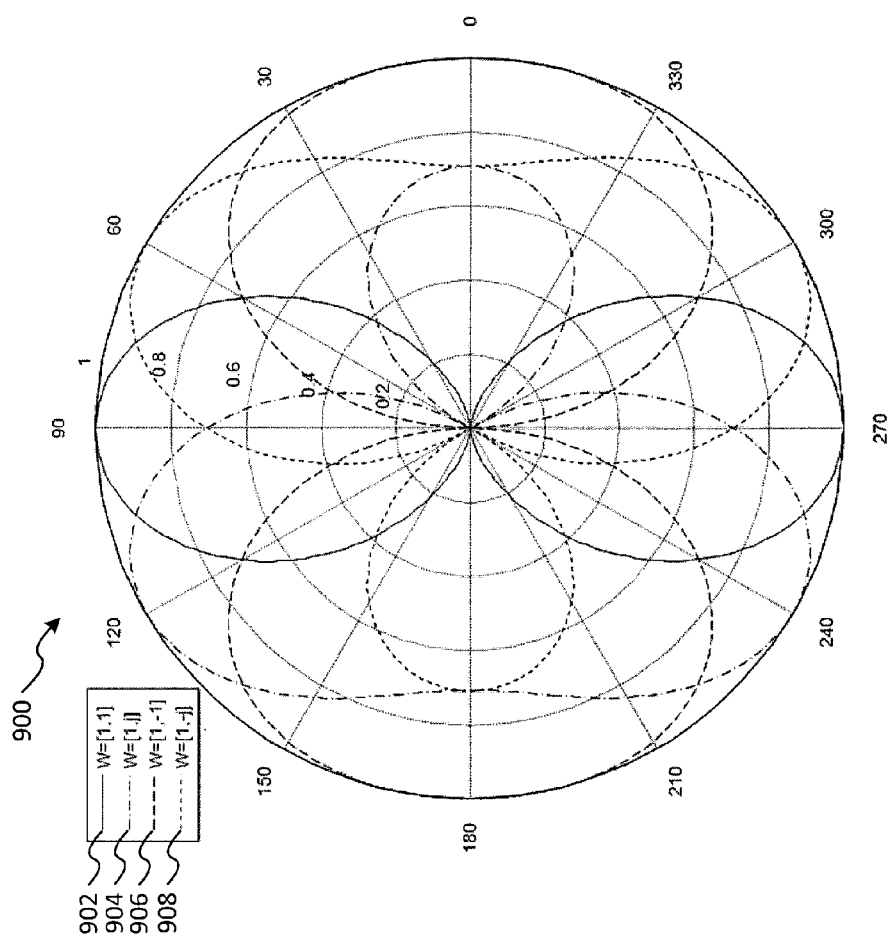
FIG. 9 is a diagram illustrating radiation patterns of an exemplary configuration of a plurality of spatial filters.

Referring to FIG. 9, a diagram illustrating radiation patterns of an exemplary configuration of a plurality of spatial filters is shown as a diagram 900. As shown in FIG. 9, the diagram 900 includes a first radiation pattern 902, a second radiation pattern 904, a third radiation pattern 906, and a fourth radiation pattern 908 are shown. Each of the radiation patterns 902, 904, 906, 908 may correspond to a single spatial filter of the plurality of spatial filters. For example, the first radiation pattern 902 may be associated with a first spatial filter (e.g., "w=[1,1]"), the second radiation pattern 904 may be associated with a second spatial filter (e.g., "w=[1,j]"), the third radiation pattern 906 may be associated with a third spatial filter (e.g., "w=[1,-1]"), and the fourth radiation pattern 908 may be associated with a fourth spatial filter (e.g., "w=[1,-j]").

In an aspect, the first spatial filter associated with the first radiation pattern 902 may correspond to the spatial filter associated with the beam 412 of FIG. 4. Thus, the beam 412 illustrated and described with reference to FIG. 4 may have an actual radiation pattern that corresponds to the first radiation pattern 902. Thus, as can be seen in FIG. 9, the beam (e.g., the radiation pattern 902) formed by the first spatial filter may strengthen (e.g., increased gain) signals from the north and south directions, and suppresses signals from the east and west directions. Directions in between, such as the northeast direction, have medium gain. Similarly, the beam 414 of FIG. 4 may have an actual radiation pattern that corresponds to the second radiation pattern 904, the beam 416 of FIG. 4 may have an actual radiation pattern that corresponds to the third radiation pattern 906, and the beam 418 of FIG. 4 may have an actual radiation pattern that corresponds to the fourth radiation pattern 908.

As can be seen in FIG. 9, by defining a plurality of spatial filters according to one or more aspects of the present disclosure, a multidimensional space may be divided into a plurality of regions (e.g., the beams 412, 414, 416, 418 of FIG. 4 and the corresponding radiation patterns 902, 904, 906, 908) with some overlap between the regions, such that signals may be received and physical network identities may be detected from any direction within the multidimensional space. Additionally, as described with reference to FIGS. 1-8, and as is apparent from the radiation patterns illustrated in FIG. 9, each of the plurality of spatial filters strengthens signals received from one or more directions (e.g., directions within the radiation pattern of each spatial filter) while suppressing signals received from other directions (e.g., directions outside the radiation pattern of each spatial filter). It is noted that signals received from some directions may not be suppressed or strengthened depending on the particular spatial filter applied and the direction the signals are received from (e.g., signals received from the northeast may have medium gain when applying the first spatial filter associated with the first radiation pattern 902). It is further noted that, although some signals may not be suppressed or strengthened by application of a particular filter, such signals may be suppressed or strengthened by application of one or more other spatial filters of the plurality of spatial filters. Thus, it can be seen that utilizing a plurality of spatial filters to perform a cell search according to one or more of the aspects disclosed herein provides improved performance compared to performing cell searches using other techniques (e.g., using only a single spatial filter or using non-coherent combining).

It is noted that, although FIGS. 1-9 describe aspects of a system, an apparatus, a method, and a computer-readable storage device for performing a cell search in a multiple antenna wireless system using two to four antennas and four spatial filters, the present disclosure is not intended be limited to these specific examples, which have been provided herein for purposes of illustration, rather than by way of limitation. Furthermore, cell searches performed according to one or more aspects of the present disclosure, as described above, may utilize any number of antennas (e.g., two or more), and may use more than four spatial filters or less than four spatial filters (e.g., two or three spatial filters). Additionally, although exemplary aspects for configuring spatial filters during a cell search are disclosed herein, other techniques for configuring, weighting, rotating, or otherwise applying a plurality of spatial filters to a plurality of signal streams may be apparent to one of ordinary skill upon review of this disclosure, and such other techniques are to be considered within the scope of this disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
applying a plurality of spatial filters to a plurality of received signal streams to generate a plurality of spatially filtered signal streams, wherein the plurality of received signal streams correspond to signals received at a plurality of receive antennas from a plurality of signal sources of one or more cellular communication networks;
correlating the plurality of spatially filtered signal streams with local sequences, wherein each of the local sequences corresponds to one of a plurality of physical network identities; and
detecting one or more physical network identities based on the correlating of the plurality of spatially filtered signal streams with the local sequences.

2. The method of claim 1, wherein each of the plurality of spatial filters are applied to the plurality of received signal streams separately.

3. The method of claim 2, wherein detecting the one or more physical network identities based on the plurality of spatially filtered signal streams includes detecting one or more physical network identities based on each of the plurality of spatially filtered signal streams.

4. The method of claim 2, wherein, when a particular spatial filter is applied to the plurality of received signal streams, signals received at the plurality of receive antennas from one or more particular directions are strengthened, and signals received from directions that are different from the one or more particular directions are suppressed.

5. The method of claim 1, wherein the plurality of spatial filters are weighted spatial filters, and wherein applying the plurality of spatial filters to the plurality of received signal streams includes weighted combining the plurality of received signal streams based on a set of filter weights.

6. The method of claim 5, wherein the method includes generating a correlation matrix based on the plurality of received signal streams, wherein the set of filter weights are determined, based at least in part on the correlation matrix.

7. The method of claim 6, wherein the set of filter weights $\{\tilde{w}\, m,n\}$ include a set of adaptive weights, and wherein the method includes:
generating a rotation matrix based on the correlation matrix; and
rotating the plurality of spatial filters based on the rotation matrix prior to applying the spatial filters to the plurality of received signal streams.

8. The method of claim 5, wherein the plurality of receive antennas includes N receive antennas, wherein the plurality of spatial filters includes M spatial filters, and wherein the set of filter weights is given by $\{\tilde{w}\, m,n\}$ for n=1 to N and m=1 to M.

9. The method of claim 8, wherein N=2, wherein M=4, and wherein the set of filter weights $\{\tilde{w}\, m,n\}$ is given by:
$\{\tilde{w}\, 1,1, \tilde{w}\, 1,2\}=\{1,1\}$;
$\{\tilde{w}\, 2,1, \tilde{w}\, 2,2\}=\{1,-1\}$;
$\{\tilde{w}\, 3,1, \tilde{w}\, 3,2\}=\{1,j\}$; and
$\{\tilde{w}\, 4,1, \tilde{w}\, 4,2\}=\{1,-j\}$.

10. The method of claim 8, wherein N=4, wherein M=4, and wherein the set of filter weights $\{\tilde{w}\, m,n\}$ is given by:
$\{\tilde{w}\, 1,1, \tilde{w}\, 1,2, \tilde{w}\, 1,3, \tilde{w}\, 1,4\}=\{1,1,1,1\}$;
$\{\tilde{w}\, 2,1, \tilde{w}\, 2,2, \tilde{w}\, 2,3, \tilde{w}\, 2,4\}=\{1,1,-1,-1\}$;
$\{\tilde{w}\, 3,1, \tilde{w}\, 3,2, \tilde{w}\, 3,3, \tilde{w}\, 3,4\}=\{1,-1,1,-1\}$; and
$\{\tilde{w}\, 4,1, \tilde{w}\, 4,2, \tilde{w}\, 4,3, \tilde{w}\, 4,4\}=\{1,-1,-1,1\}$.

11. The method of claim 8, wherein the set of filter weights $\{\tilde{w}\, m,n\}$ include a set of pre-defined weights.

12. The method of claim 1, wherein the method includes:
selecting one or more physical network identities of the plurality of physical network identities based on a correlation between each of the spatially filtered signal streams and the local sequences.

13. The method of claim 12, wherein the method includes normalizing the correlation between each of the spatially filtered signal streams and the local sequences prior to selecting the one or more physical network identities.

14. The method of claim 13, wherein each of the one or more physical network identities is selected based on a magnitude of a normalized correlation between a particular filtered signal stream and a particular local sequence.

15. The method of claim 1, wherein the plurality of signal sources correspond to electronic devices configured to transmit and receive information in accordance with one or more wireless communication protocols, the one or more wireless communication protocols includes a long term evolution (LTE) communication protocol, an LTE-Advanced (LTE-A) communication protocol, a wideband code division multiple access (WCDMA) communication protocol, or a combination thereof, and wherein the signals are received at the plurality of receive antennas in accordance with the one or more wireless communication protocols.

16. An apparatus comprising:
a plurality of receive antennas configured to receive signals from a plurality of signal sources of one or more cellular communication networks; and
a processor configured to:
apply a plurality of spatial filters to a plurality of received signal streams to generate a plurality of spatially filtered signal streams, wherein the plurality of received signal streams correspond to the signals received at the plurality of receive antennas;
correlate the plurality of spatially filtered signal streams with local sequences, wherein each of the local sequences corresponds to one of a plurality of physical network identities; and
detect one or more physical network identities based on the correlating of the plurality of spatially filtered signal streams with the local sequences.

17. The apparatus of claim 16, wherein the plurality of receive antennas includes N receive antennas, and wherein the plurality of spatial filters includes M spatial filters, and wherein the plurality of spatial filters are weighted based on a set of pre-defined weights ($\tilde{w}\, m,n$) for n=1 to N and m=1 to M.

18. The apparatus of claim 16, wherein the processor is further configured to:
estimate a correlation matrix (R) based on a plurality of signal streams;
determine weights associated with the plurality of spatial filters based on the correlation matrix (R); and
generate a plurality of weighted spatial filters based on the determined weights.

19. The apparatus of claim 18, wherein the processor is further configured to:
select a vector (r) from the correlation matrix (R), wherein the vector (r) includes a maximum magnitude in one of non-upper triangular matrix elements of the correlation matrix (R) and non-lower triangular matrix elements of the correlation matrix (R); and generate a filter weight ($w_{adp}$ m,n) for an n-th tap in an m-th spatial filter according to an equation given by:

$$w_{adp}m,n=(\tilde{w}m,n)*(rn)/|(rn)|,$$

wherein (rn) denotes an n-th element of the vector (r), wherein |rn| denotes a norm of (rn), and wherein ($\tilde{w}$ m,n) corresponds to a set of predefined weights for n=1 to N and m=1 to M.

20. The apparatus of claim 16, wherein the processor is further configured to select one or more of the detected one or more physical network identities based on a normalized correlation power of each of the plurality of spatially filtered signal streams.

21. The apparatus of claim 20, wherein the processor is further configured to determine the normalized correlation power according to an equation given by:

$$\gamma_m^{norm}(N_{Cell-id}) = \frac{\left|\sum_k s_m^{fil}(k) \cdot p_{N_{Cell-id}}^{local}(k)\right|^2}{\sum_k |s_m^{fil}(k)|^2}, m = 1, 2, \ldots, M$$

where M corresponds to a number of spatial filters included in the plurality of spatial filters, m represents an m-th spatial filter, $s_m^{fil}(k)$ represents a filtered signal output by the m-th spatial filter, $p_{N_{Cell-id}}^{local}(k)$ corresponds to a local sequence to be correlated with the filtered signal $s_m^{fil}(k)$ output by the m-th spatial filter, $\Sigma_k s_m^{fil}(k) \cdot p_{N_{Cell-id}}^{local}(k)$ represents a correlation between the filtered signal $s_m^{fil}(k)$ output by the m-th spatial filter and the local sequence $p_{N_{Cell-id}}^{local}(k)$, $\Sigma_k |s_m^{fil}(k)|^2$ is a square sum representative of the power of $s_m^{fil}(k)$, and $\gamma_m^{norm}(N_{Cell-id})$ represents the normalized correlation power.

22. The apparatus of claim 16, wherein the processor is further configured to:
regenerate signals based on local sequences specified by each of the detected one or more physical network identities; and
cancel the regenerated signals from subsequently generated spatially filtered signal streams generated by the plurality of spatial filters.

23. The apparatus of claim 16, wherein the processor is further configured to generate a rotation matrix, and to rotate the plurality of spatial filters based on the rotation matrix.

24. The apparatus of claim 23, wherein the processor is further configured to generate a correlation matrix based on the plurality of received signal streams, wherein the correlation matrix is representative of a correlation between the signals received at each of the plurality of receive antennas, and wherein the rotation matrix is given by:

$$F_{rotate} = \begin{bmatrix} \frac{r_1}{\|r_1\|} & & 0 \\ & \ddots & \\ 0 & & \frac{r_N}{\|r_N\|} \end{bmatrix},$$

wherein $F_{rotate}$ is a diagonal matrix with non-zero diagonal entries, $r_n$ denotes an n-th element of a vector (r) selected from the correlation matrix, and $\|r_n\|$ denotes the norm of $r_n$.

25. A computer-readable storage device storing instructions that, when executed by a processor, cause the processor to perform operations comprising:
applying a plurality of spatial filters to a plurality of received signal streams to generate a plurality of spatially filtered signal streams, wherein the plurality of received signal streams correspond to signals received at a plurality of receive antennas from a plurality of signal sources of one or more cellular communication networks;
correlating the plurality of spatially filtered signal streams with local sequences, wherein each of the local sequences corresponds to one of a plurality of physical network identities; and
detecting one or more physical network identities based on the correlating of the plurality of spatially filtered signal streams with the local sequences.

26. The computer-readable storage device of claim 25, wherein each of the plurality of spatial filters are applied the plurality of received signal streams separately.

27. The computer-readable storage device of claim 26, wherein detecting the one or more physical network identities based on the plurality of spatially filtered signal streams includes detecting, for each of the plurality of spatial filters, a physical network identity corresponding to a particular spatially filtered signal stream having a strongest signal strength.

28. The computer-readable storage device of claim 26, wherein, when a particular spatial filter is applied to the plurality of received signal streams, signals received at the plurality of receive antennas from one or more particular directions are strengthened, and signals received from directions that are different from the one or more particular directions are suppressed.

29. The computer-readable storage device of claim 25, wherein the plurality of spatial filters are weighted spatial filters, and wherein applying the plurality of spatial filters to the plurality of received signal streams includes weighted combining the plurality of received signal streams based on a set of filter weights.

30. The computer-readable storage device of claim 29, wherein the operations include generating a correlation matrix based on the plurality of received signal streams, wherein the set of filter weights is calculated based on the correlation matrix.

31. The computer-readable storage device of claim 29, wherein the plurality of receive antennas includes N receive antennas, wherein the plurality of spatial filters includes M spatial filters, and wherein the weighted spatial filters are given by {$\tilde{w}$ m,n} for n=1 to N and m=1 to M.

32. The computer-readable storage device of claim 31, wherein N=2, wherein M=4, and wherein the weighted spatial filters {$\tilde{w}$ m,n} are given by:
{$\tilde{w}$ 1,1, $\tilde{w}$ 1,2}={1,1};
{$\tilde{w}$ 2,1, $\tilde{w}$ 2,2}={1,−1};
{$\tilde{w}$ 3,1, $\tilde{w}$ 3,2}={1,j}; and
{$\tilde{w}$ 4,1, $\tilde{w}$ 4,2}={1,−j}.

33. The computer-readable storage device of claim 31, wherein N=4, wherein M=4, and wherein the weighted spatial filters {$\tilde{w}$ m,n} are given by:
{$\tilde{w}$ 1,1, $\tilde{w}$ 1,2, $\tilde{w}$ 1,3, $\tilde{w}$ 1,4}={1,1,1,1};
{$\tilde{w}$ 2,1, $\tilde{w}$ 2,2, $\tilde{w}$ 2,3, $\tilde{w}$ 2,4}={1,1,−1,−1};
{$\tilde{w}$ 3,1, $\tilde{w}$ 3,2, $\tilde{w}$ 3,3, $\tilde{w}$ 3,4}={1,−1,1,−1}; and
{$\tilde{w}$ 4,1, $\tilde{w}$ 4,2, $\tilde{w}$ 4,3, $\tilde{w}$ 4,4}={1,−1,−1,1}.

34. The computer-readable storage device of claim 31, wherein the weighted spatial filters {$\tilde{w}$ m,n} include a set of pre-defined weights.

35. The computer-readable storage device of claim 25, wherein the operations include:
selecting one or more physical network identities of the plurality of physical network identities based on a correlation between each of the spatially filtered signal streams and the local sequences.

36. The computer-readable storage device of claim 35, wherein the operations include normalizing the correlation between each of the spatially filtered signal streams and the local sequences, wherein each of the one or more physical network identities is selected based on a magnitude of a normalized correlation between a particular spatially filtered signal stream and a particular local sequence.

37. The computer-readable storage device of claim 25, wherein the operations include:
   generating a rotation matrix; and
   rotating the plurality of spatial filters based on the rotation matrix prior to applying the spatial filters to the plurality of received signal streams.

38. The computer-readable storage device of claim 37, wherein the operations include generating a correlation matrix based on the plurality of received signal streams, and wherein the correlation matrix is representative of a correlation between the signals received at each of the plurality of receive antennas.

* * * * *